US007766526B2

(12) United States Patent
Dwyer et al.

(10) Patent No.: US 7,766,526 B2
(45) Date of Patent: Aug. 3, 2010

(54) ILLUMINATION SYSTEM (75) Inventors: Daniel Dwyer, Medinah, IL (US); J. Boyd Hildebrant, Palatine, IL (US); Jeff Graham, Winnetka, IL (US)

(73) Assignee: iSky Panel Systems, Inc., Winnetka, IL (US)

( * ) Notice: Subject to any disclaimer, the term of this patent is extended or adjusted under 35 U.S.C. 154(b) by 40 days.

(21) Appl. No.: 11/854,976

(22) Filed: Sep. 13, 2007

(65) Prior Publication Data
US 2008/0062713 A1  Mar. 13, 2008

Related U.S. Application Data (60) Provisional application No. 60/844,220, filed on Sep. 13, 2006.

(51) Int. Cl.
*F21V 7/04* (2006.01)

(52) U.S. Cl. .......................... 362/554; 345/84; 349/61

(58) Field of Classification Search ............... 362/551, 362/554, 555, 583, 561, 565, 145, 153, 153.1, 362/351, 293, 321; 349/1, 5, 6, 119, 18, 349/61; 353/30, 84
See application file for complete search history.

(56) References Cited

U.S. PATENT DOCUMENTS

| | | | |
|---|---|---|---|
| 3,836,911 A | 9/1974 | Gibson et al. | |
| 4,754,372 A | 6/1988 | Harrison | |
| 5,013,109 A * | 5/1991 | Zelan et al. | 385/115 |
| 5,293,437 A * | 3/1994 | Nixon | 385/115 |
| 5,838,860 A | 11/1998 | Kingstone et al. | |
| 5,838,865 A * | 11/1998 | Gulick | 385/121 |
| 6,040,936 A * | 3/2000 | Kim et al. | 359/245 |
| 6,082,886 A | 7/2000 | Stanford | |
| 6,195,016 B1 * | 2/2001 | Shankle et al. | 340/815.42 |
| 6,198,872 B1 * | 3/2001 | Lipson et al. | 385/117 |
| 6,210,012 B1 * | 4/2001 | Broer | 362/84 |
| 6,252,638 B1 * | 6/2001 | Johnson et al. | 349/5 |
| 6,256,811 B1 | 7/2001 | Nelson | |
| 6,286,969 B1 * | 9/2001 | Kurokawa et al. | 362/11 |
| 6,655,825 B2 * | 12/2003 | Muthu et al. | 362/561 |
| 6,840,662 B2 | 1/2005 | Isaacson et al. | |
| 7,018,084 B2 | 3/2006 | Gotfried | |
| 7,121,702 B2 | 10/2006 | Muller | |
| 7,163,327 B2 * | 1/2007 | Henson et al. | 362/554 |
| 7,540,644 B1 * | 6/2009 | Allen | 362/554 |
| 2005/0265038 A1 | 12/2005 | Muller | |

* cited by examiner

*Primary Examiner*—Jacob Y Choi
(74) *Attorney, Agent, or Firm*—Lathrop & Gage LLP (57) ABSTRACT

Disclosed is an illumination device. The device includes a light engine in an acoustic tile that introduces light into a plurality of optical fibers using an LED. In between the LED and the fiber ends, an LCD is used to modify the light introduced. To do this, the LCD is programmed to display petal-shaped sections which individually change in contrast to become more occluded and then more transparent. This creates an aesthetically pleasing effect resembling stars.

7 Claims, 6 Drawing Sheets

ILLUMINATION SYSTEM

RELATED APPLICATIONS

This application claims the benefit of U.S. Provisional Application No. 60/844,220 filed Sep. 13, 2006, the contents of which are herein incorporated by reference.

BACKGROUND OF THE INVENTION

1. Field of the Invention

The present invention relates generally to the field of illumination. More specifically, the present invention is a panel used to create an optical effect using fiber-optic strands.

2. Description of the Related Art

Fiber optic strands have been used to create star light points in panels in the prior art. These conventional systems typically use a standard incandescent bulb as a light source. Light points have been created on the undersides of the panels using the fiber optic fibers to create a flickering light effect. See, e.g., U.S. Pat. No. 5,013,109 issued to Zelan et al.

But these prior art systems are difficult to install. They are also typically expensive. Further, the light sources used have relatively short life spans, and bulb replacement can be difficult.

SUMMARY OF THE INVENTION

The disclosed embodiments overcome these disadvantages present in the prior art devices. In one embodiment, this is done by providing an illumination system comprising at least one light emitting diode (LED); at least one fiber optic device, said fiber optic device adapted to receive light from said LED for the purpose of illuminating; and a liquid crystal display (LCD) optically between said LED and said fiber optic device, said LCD one of: (i) partially occluding, (ii) completely occluding, and (iii) filtering said light. Other embodiments are also disclosed.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The disclosed embodiments provide a system and method for creating a star-like and other effects in an area using a panel. More specifically, they disclose the use of a programmed LCD display as a light modifier between an LED light source and fiber optic strands. The light emitted from the LED is interfered with by dynamically changing patterns displayed on the LCD. The LCD has different sectors (petal shaped in the disclosed embodiments) which cause the lighting effects to be different in the different strands. The distal ends of the strands are spread about the panel. Thus, the different lighting effects presented from the different strands, or strand groups, creates a unique and pleasing effect.

Embodiments are disclosed in FIGS. 1-11. Referring first to FIGS. 1A-C a panel 100 of the present invention is disclosed. The depiction in FIG. 1A is actually incomplete. The mid section of the panel has been removed to make the drawing better fit the page. The scaled down drawings shown in FIGS. 1B and 1C are scaled down, but disclose the full panel.

Figure 1A:
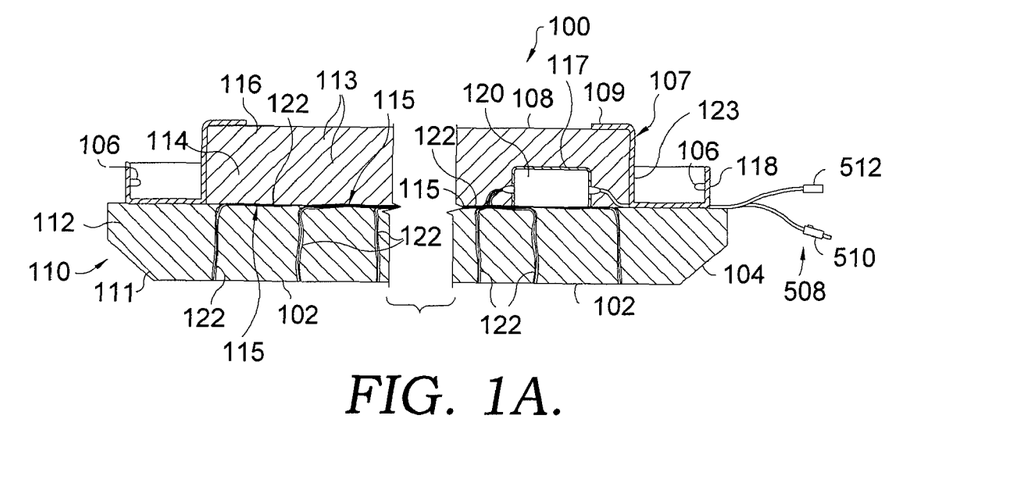
FIGS. 1A-C show various views and cross sections of a panel of the present invention.
Figure 1B:
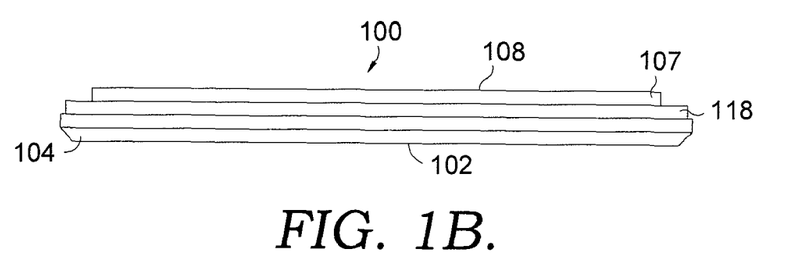
Figure 1C:
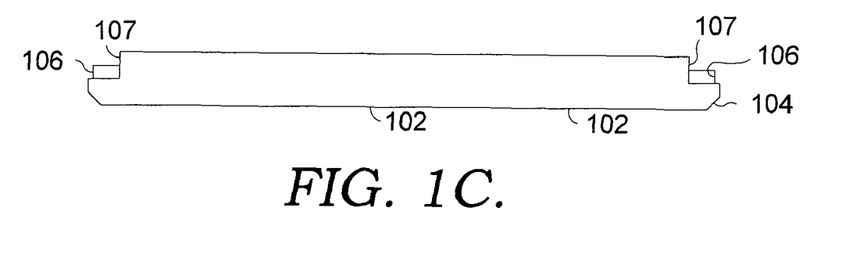

The left-hand side of FIG. 1A is an end view of the panel, but the right hand side of the figure is a removed cross section exposing internal features of the device. FIG. 1B is a cross-sectional taken of the tile. FIG. 1C is an end view of the tile showing the acoustical fiber tile as it appears on its end, like with the left hand side of FIG. 1A.

Referring first to the details of FIG. 1A, it may be seen that the acoustical tile device 100 comprises different portions. The first portion of acoustical tile 111 comprises a beveled lower section 110 and an upper portion 112, each of which are integral with the other. A down most face 102 of the acoustical fiber will likely be covered with cloth, laminant, or paint as is known to those skilled in the art.

An upper acoustical tile 113 comprises a bottom portion 114 and a top portion 116. Portions 110 and 112 are integral with each other. Similarly, portions 114 and 116 are integral with one another. The upper portion 113 and lower portion 111 will ultimately be adhered or otherwise adhered to one another at a centerline seam 115. Seam 115 acts as a receiving area for running electrical wiring and optical fibers in the panel.

On the right-hand side of FIG. 1A, the insides of a plastic trim piece 107 are shown. The plurality of lineal LEDs 106 which, in FIGS. 1A and 1B, extend into and out of the depth of the page. Light emitted from these LEDs bounces off of a reflective surface 107, and then, reflects off an upper surface, e.g., a ceiling, to create an indirect edge-lighting effect around the panel. As can be seen in FIGS. 1A and 1B, the LED strip arrangement 106 appears on both sides of the tile. It is also contemplated, however, that the edge lighting arrangement could be provided about all four edges of the tile if desired. Further, in one embodiment colored LEDs are used in lineal arrangement 106. More specifically, blue LEDs are used in strip 106 in the disclosed embodiments. But any color, including white, could be used as well and still fall within the scope of the present invention.

As is best seen at the right hand side of FIG. 1A, plastic trim piece 107 has an upper portion 109 which extends laterally only a short distance into the tile along upper surface 108 (½ inch in the preferred embodiment). Thus, the trim does not cover upper surface 108. The lack of coverage is desirable because the relatively softer fiberglass acoustic tile is what is used to receive anchors when installing the panel onto a surface, such as a wall or ceiling. FIG. 1C shows that an outside face of the LED housing 118 extends the length of the end view as does the reflective portion 107 on the plastic trim.

In another embodiment, trim piece 107 is unnecessary and LED strip 106 is mounted at a location 123 such that the LEDs omit directly out. This simplified version also creates an alternative edge lighting effect without using a trim piece. Although not depicted, it should be understood that an identical set of laterally projecting LEDs (like the purported strip at 123) could be located on the opposite side of the tile as well.

It should be understood that regardless of whether they are used with or without the trim piece, that the location of the edge lighting arrangement is entirely optional. For example, where multiple panels are connected together to create one big panel, the user would likely install the edge lighting LEDs at all locations around the total combined panel, which would involve installation at all exposed edges. No LED strips, in this embodiment, would be needed along the edges where sub-panels are in abutment, but instead about the edges of the conglomeration.

Referring back to FIG. 1A, it can be seen that an internal removed area in upper portion 113 of the panel receives a light generating/star engine 120. From star engine 120, a plurality of fiber-optic strands 122 are caused to travel along seam 115 which exists between separate panels 111 and 113. Thus, the seam enables the strands to travel between the two panels and then be threaded downward through the accoustical tile sections 110 and 112 where the optical fibers poke out of bottom surface 102. Light emitted from these fibes will be used for the purpose of creating an optical effect. Although the fibers shown in FIG. 1A are maintained in separate groups, it is also possible that each strand could be independently threaded down into the lower portion 111 and emit light from an independent location at bottom surface 102.

Figure 2A:
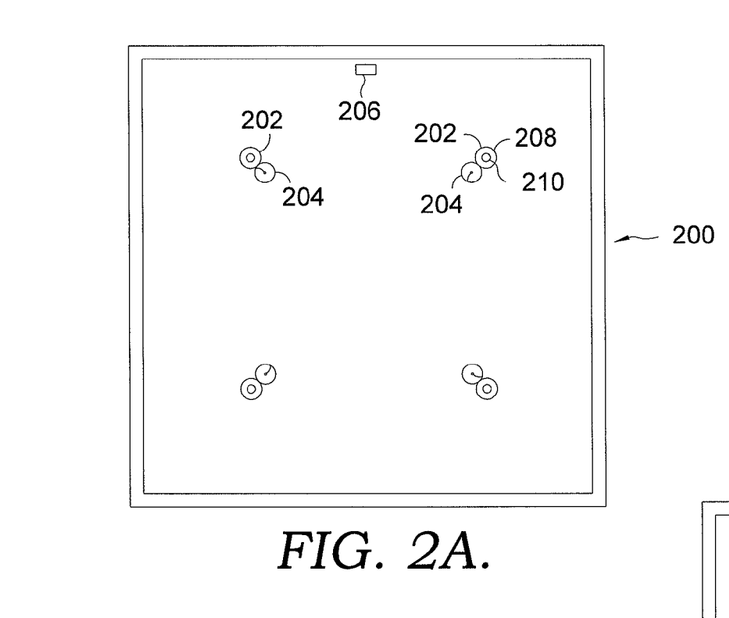
FIGS. 2A, 3, and 4 show three different embodiments of the present invention where the acoustical tile structure has been removed.
Figure 3:
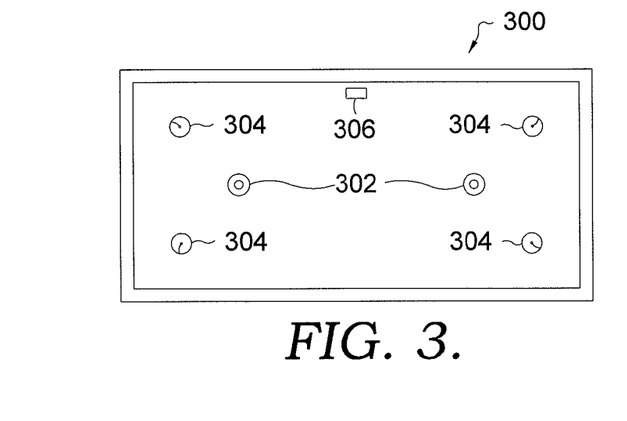
Figure 4:
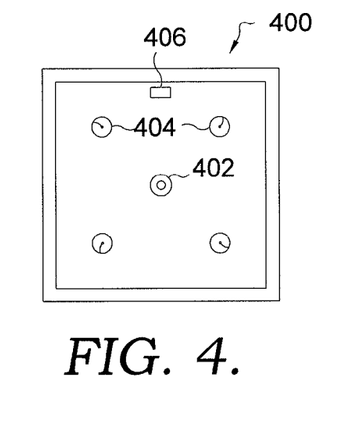

FIGS. 2 through 4 disclose three separate panel embodiments—panels 200, 300 and 400—which are sized differently. Components in each are also arranged in different ways.

Looking first to the embodiment disclosed in FIG. 2A, a star engine 206 is installed in the acoustic tile in the location shown. It is important to note that each of FIGS. 2 through 4 reveal devices in the panels that would not be observable unless the fiberglass acoustic tile material is removed, as is the case in each of FIGS. 2-4.

FIG. 2A is a relatively large square embodiment 200 for a panel. This embodiment uses of four anchors 204. These anchors are screwed to a mounting surface and then reverse anchored into the tile material (e.g., at upper surface 108 in FIG. 1A). More specifically, Rotofast™ anchors are used in the preferred embodiment. These anchors are widely used for the purpose of fixing acoustical tiles to surfaces or also suspending tiles from a ceiling (also known as a cloud-type installation). These fasteners are used by first using an awl to punch mark a desired installation point through the acoustic tile and into the surface, e.g., drywall. With the FIG. 2A embodiment, this would have to be done at four different locations. Then, screws are used to secure the Rotofast™ anchors 204 to the drywall or other surface. These anchors include a snap down portion. Once snapped down into a locking position, an upper portion of each anchor is able to receive a hex tool. The hex tool is inserted through the acoustical tile and turned. This causes reverse threads on each anchor 204 to draw the panel to the mounting surface.

Figure 2B:
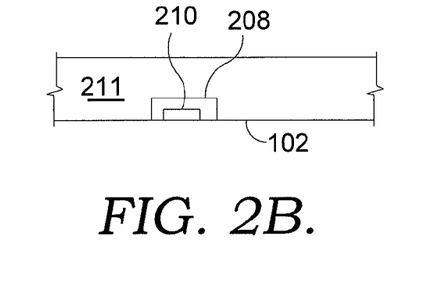
FIG. 2B shows the downlighting LEDs included in the tile structures of the present invention.

One embodiment for the horizontal locations for the anchors can be seen in FIG. 2A. FIG. 2A shows that the anchors 204 are screwed into the top portion of the acoustical tile (upper surface 108 as shown in FIG. 1A) at the locations shown. Also shown in FIGS. 2A and B are a plurality of LED down lights 202. Each of these LED down lights is nested in the acoustical tile so that it directs white light down out of the lower surface (e.g., surface 102) of the tile. FIG. 2B in particular shows this vertical orientation, and also that each down light includes a light emitting LED device 210 which is included in a cylindrical mounting unit 208 which receives each downlight LED 210. These units 208 not only receive and house the downlight LEDs 210, but also act as heat sinks to protect the acoustical tile/member 200. Each downlight is formed into the lower portion 111 of the panel as shown. In the preferred embodiment, these LED down lights are directed substantially downward and receive a DC source of power (not shown). These LEDs may be used as the primary light source in a room, or used in combination with other light sources for conventional (not ornamental) lighting purposes. Thus, they will likely be switched off when a nighttime sky effect is desired.

Figure 5A:
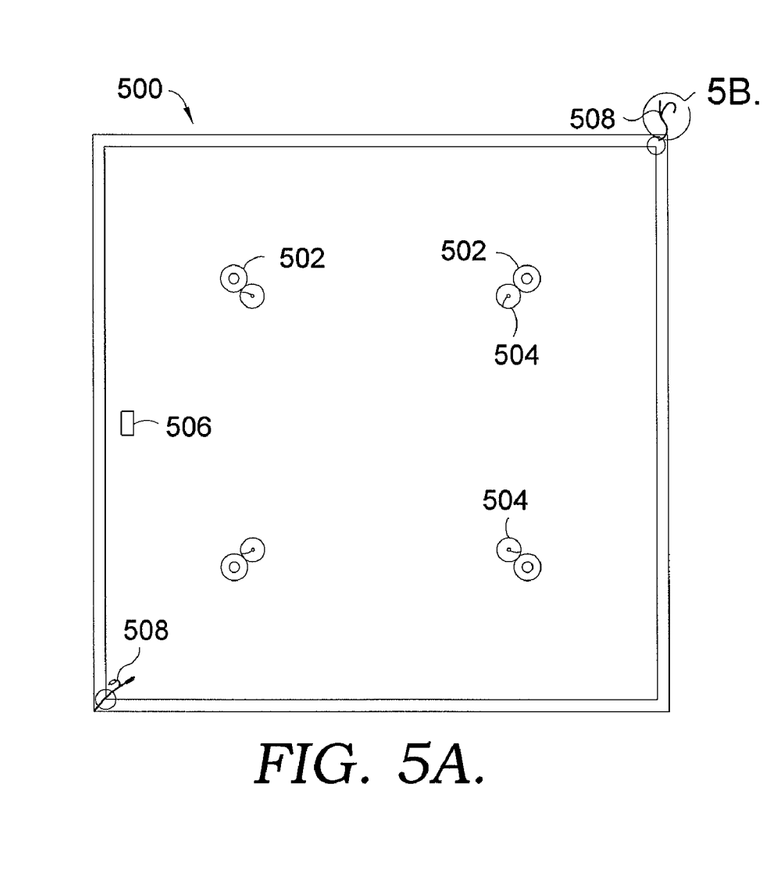
FIGS. 5A and B show electrical power connections used in an embodiment of the present invention.
Figure 5B:
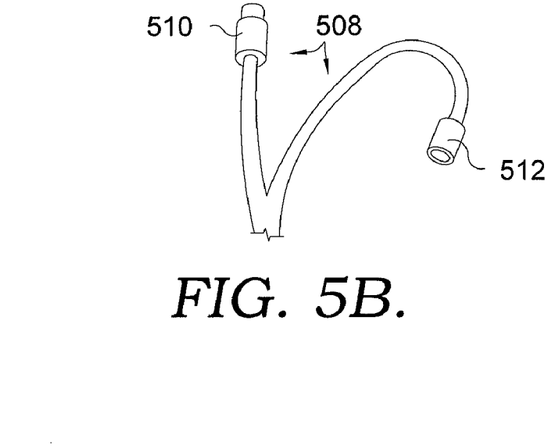

In terms of an electrical connection, these LED down lights receive the source of DC power through wires which are threaded through seam 115 (see FIG. 1A) and then threaded down to connect up with and power down lights 202. Alternatively, these wires could pass through all the way to the upper face 108 and not be threaded through the seam. These wires will be electrically connected into, and also receive power from electrical connectors 508, which are shown in FIGS. 5A and 5B and will be discussed hereinafter in more detail. One skilled in the art will recognize that electrical leads are able to be easily connected from a power source to each downlight.

FIG. 3 shows an alternative rectangular embodiment 300 for a panel. This embodiment includes only two down light LED devices 302, four anchors 304, and a star engine 306. All of these devices are installed in the same manner as discussed regarding the FIG. 2A embodiment above, except that the locations have been changed to accommodate the different panel shape and size.

FIG. 4 shows a square, relatively small embodiment. In FIG. 4, only a single LED down light 402 is provided. The single LED down light 402 is surrounded by four anchors 404. This embodiment, like the others, has a star engine 406 which is included into the acoustical tile.

Two tiles of the FIG. 4 size and shape could be used to cover a similar area which would be occupied by the FIG. 3 rectangular version. Similarly, two rectangular versions (FIG. 3) could be used to occupy the same space as one FIG. 2A version tile. Finally, four FIG. 4 panels could be used instead of one FIG. 2A version. The selection of a particular embodiment will depend on the space available and also a user's particular taste and/or preferences.

FIGS. 5A and 5B disclose the piggyback connector arrangements for the disclosed panels. A panel 500, like with the earlier embodiments, includes a plurality of fasteners 504, and LED down lights 502, and a star engine 506. FIGS. 5A and 5B also show how the DC electrical connections are made corner to corner from one panel to the next. Panel 500 will typically be included along with a plurality of other panels, all of which must receive a source of DC power for operation purposes. When this is the case, the electrical interconnection is accomplished by providing a connecting pair 508 including a male 510 connector and a female 512 connector at each of one set of opposite corners on the panel. Each male connector 510 is received into a female connector (not shown) on an adjacent corner on a next tile (not shown). Similarly, the female connector 512 will receive a male connector on that same adjacent corner. Thus, the panels are connectable to each other in parallel in a piggy-back arrangement.

The electrical connections from the connector arrangements 508 to the star engine 506, LED down lights 502, and to the lineal LEDs (not shown in FIG. 5A, but present in the same way shown in FIG. 1A) are not shown, but one skilled in the art will recognize that the connections can be made by providing linking wires that travel through seam 115 to the particular device.

The DC power source may be received according to conventional methods. In some circumstances, the disclosed panels will be used in residential or commercial facilities. These facilities typically have 120 Volt AC power available. This source can be converted to DC power using a rectifier, inverter, ballast arrangement or other conventional technique.

It should be understood that even though the downlight LEDs are not shown in the breakout cross sectional view of FIG. 1A, that downlights such as those shown in FIGS. 2-5 (e.g., LEDs 202, 302, 402, and 502) would exist in device 100 along with the fiberoptic strands 122. In one embodiment, the downlights (LEDs 202, 302, 402, and 502) are separably operable from strands 122. In another embodiment, the downlights are activated using a common switch to the strands. In some embodiments, the downlights are used for practical indoor lighting whereas the light from the strands 122 is used primarily for aesthetical purposes.

Figure 6:
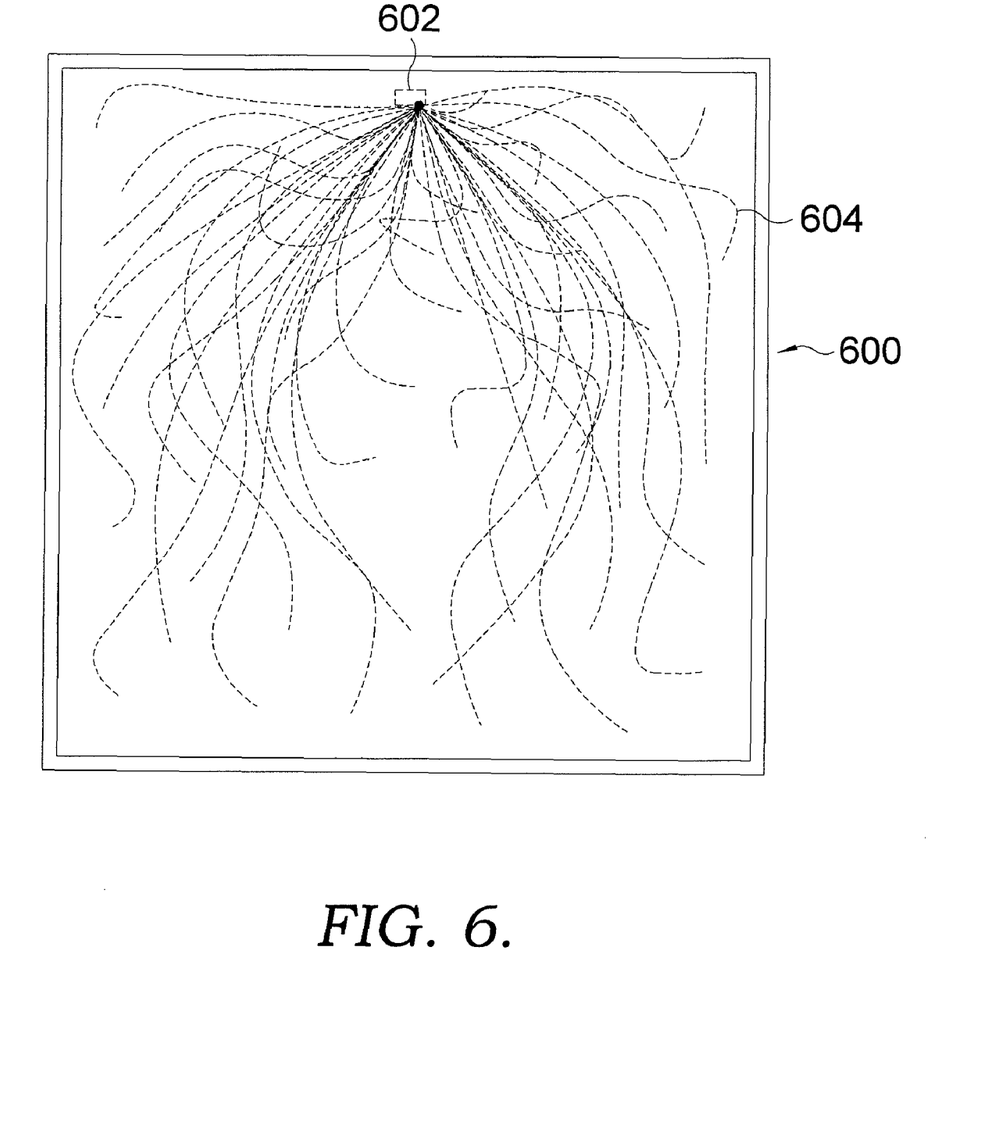
FIG. 6 shows a view of how the optical fibers are laterally woven throughout a panel of the present invention.

FIG. 6 shows how a star engine 602 of an embodiment of the present invention can be laterally woven through the acoustical panels at numerous different horizontal positions. Referring back to FIG. 1A, each of these fibers is spread out along seam 115 to different locations in the tile. In the preferred embodiment, numerous evenly spaced locations are used. Then, the fibers are poked down through the lower tile 111 as shown in FIG. 1A. As can be seen from FIG. 1A, the end of each strand is made to end consonant with lower surface 102. This enables the lower surface 102 of panel 100 to appear like a plurality of stars.

Figure 7A:
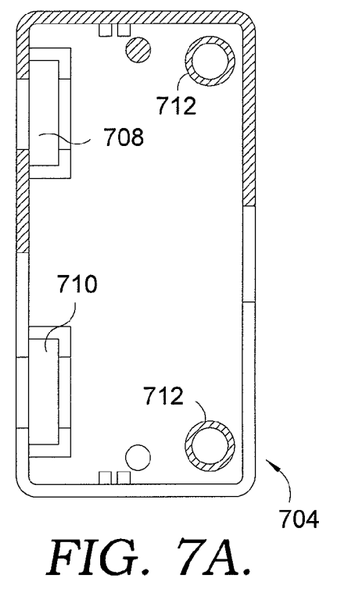
FIG. 7 shows the star engine with clamshell housing.
Figure 7B:
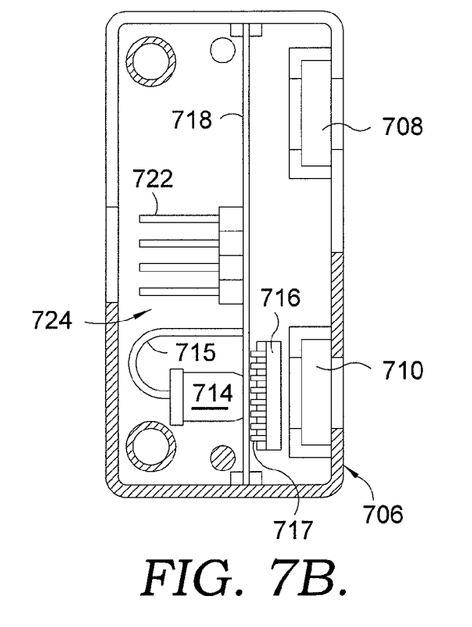
Figure 7C:
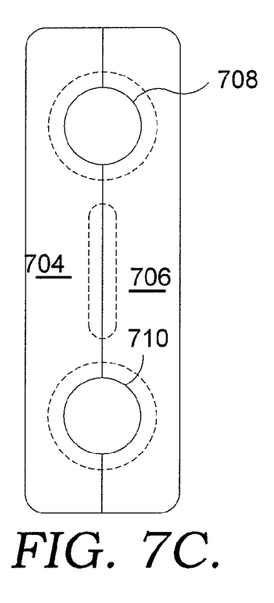

FIGS. 7A-C show different view for an embodiment 702 of a star engine usable with the disclosed embodiments. It can be seen that the engine 702 is included in a clamshell housing which comprises a first half 704 and a second half 706. First half 704 and second half 706 can be adhered or made snappably securable one to the other.

When brought fixedly together, the halves 704 and 706 define two ports. A first port 708 serves as a power cord receptacle. A second port 710 serves as a fiber-optic-cable receptacle.

FIG. 7A shows the details inside half 704 and FIG. 7B shows the details inside half 706. Referring to the figures, optional screw holes 712 are shown. These holes are not necessary in the preferred embodiment because engine 702 is simply embedded into the acoustical tile as shown in FIG. 1A. But in some situations it may be desirable to attach engine 702 to an available surface, e.g., a drywall ceiling above where the panel is being installed. In such cases, adhesive, screws or other fasteners may be used to secure engine 702 to the surface.

The electrical components of the engine are shown in FIG. 7B. These components are incorporated into a printed circuit board arrangement 718. Board 718 is shown as electrically supporting an encapsulated LED 714 using a two-pair wire 715. Although not specifically shown in the figure, it should be understood that the board 718 would include microprocessor devices as well as other known electrical equipment which enable programming of an LCD device 716. LCD 716 device is electrically connected into board 718 using a plurality of electrical connector devices 717 in a known manner. In the preferred embodiment, LCD 716 is an STN type which is attenuated with a 3:1 contrast ratio. It should be understood, however, that other LCD configurations as well as other display devices could be used as well and still fall within the scope of the present invention.

PCB board 718, in one embodiment, includes a serial interface/data port arrangement 724 which includes a plurality of pin connectors which extend through a programming port aperture 726. This arrangement, however, is not necessary with the preferred embodiment. With the preferred embodiment, software for the microprocessor devices on board 718 are preloaded, making the use and existence of arrangement 724 unnecessary. Arrangement 724 has been disclosed nonetheless simply to illustrate an alternative possibility in which the microprocessor can be interfaced with after installation.

Figure 8:
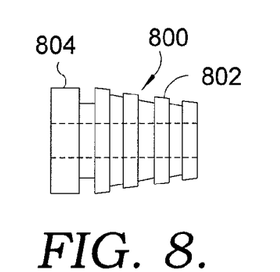
FIG. 8 shows the strain relief member used with the present invention.

FIG. 8 shows a molded rubber strain relief member 800 which is received in power cord receptacle 708 when clamshell halves 704 and 706 are collapsed on each other. More specifically, strain relief member 800 includes a locking end 804 is received into the recess 708 and held securely. A tapered, ribbed outside portion 802 extends out from the clamshell housing. The DC power supply for the electrical components of the engine is conducted through wires which are received into and protectively held within a cylindrical bore 806 along the center axis of member 800.

Figure 9:
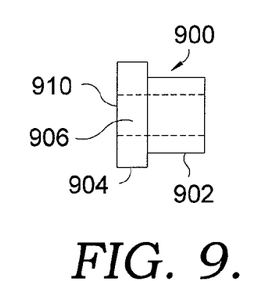
FIG. 9 shows the fiber nose piece of the present invention.
Figure 10:
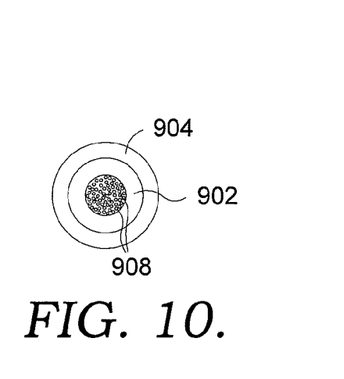
FIG. 10 shows the fiber nose piece receiving a plurality of optical fiber ends.

FIG. 9 shows a rubber nose piece 900 having a cylindrical locking end 904 and narrower concentric cylindrical portion 902. Piece 900 also has a cylindrical bore 906 there through which is used to receive and hold a plurality of fiber optic strand ends 908. FIG. 9 has the strands removed, but FIG. 10 shows how these fiber optic strands 908 are snuggly held within the bore 906 and the ends made even with a forward plane 910 defined by the front of the nose piece. So oriented, when the locking end 904 is installed in the receiving space 710 of clamshell 704, the strand ends will be used to receive light emitted from the LED 714. The light will be either occluded, filtered or unfiltered and allowed passage through LCD 716.

Figure 11A:
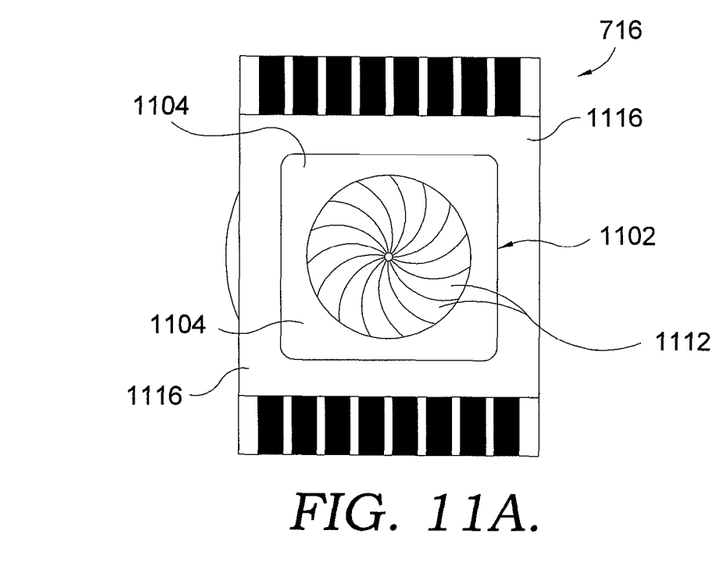
FIGS. 11A-C show the details of the LCD device used with the present invention.
Figure 11B:
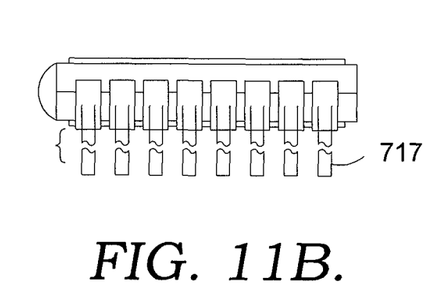
Figure 11C:
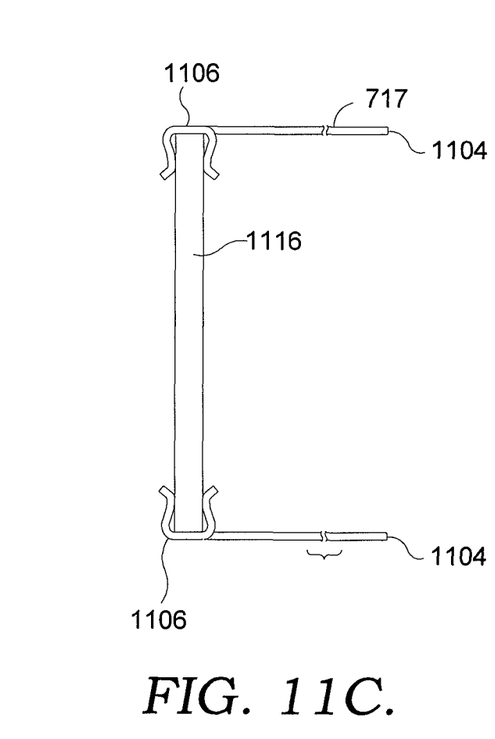

The details regarding LCD 716 are shown in FIGS. 11A-C. In these figures, it can be seen that the connector prongs 717 already discussed as included in FIG. 7 are each shown from one side in FIG. 11B and from the other side in FIG. 11C. Each prong 717 is connected to a conductive clasp 1106 which enables conductive pads on LCD 716 to receive electrical signals. LCD, based on the electrical signals received, is able to display programmed patterns. These dynamically changing patterns are generated by an algorithm running on one or more processors (not shown) on board 718 and displayed in the optically active area 1104 of the LCD. As will be known to those skilled in the art, prong ends 1104 are electrically connected into board 718 via soldering or some other known method.

FIG. 11A shows the LCD device 716 from above. In this view, it is revealed that LCD device 716 presents a display portion 1102 which includes a top portion 1104 having rounded corners. This portion defines a screen area. Supporting top portion 1104 is a bottom base portion 1116. With LCD arrangements like that shown here with device 716, top 1104 and bottom 1116 will both be transparent in the absence of electrical signals. But when LCD 716 receives electrical signals from board 718 caused by one or more algorithms running on one or more board embedded processors, a computer controlled display is enabled on the screen. Further, the displayed matter is able to be optionally transparent, occlusive, translucent, and color variable. In terms of screen coverage, the effects can be different in numerous different sectors on the device. Further, the activities can be phased in and out. For example, a particular sector can be gradually turned on or off—made to go from occlusive to translucent then to transparent. Color also can be gradually or quickly changed as desired. All of this presented content can be presented and timed according to whatever is dictated by the algorithm.

In one embodiment, a simple black and white presentation is made on LCD 716. LCD 716 in this preferred embodiment is broken out into a plurality of petal shaped sectors 1112 as part of a spiral pattern. Each of these sectors is variably and differently made to go from transparent to translucent, to opaque, and then back from opaque to translucent to transparent. Because the activity taking place in each individual petal in plurality 1112 is in a different state, the optical effect introduced into each of the fiber strand ends is different. Thus, when the light is transmitted from the light generator, filtered through the LCD it is received into the end of each fiber-optic strand which happens to be opposite that particular petal. As discussed above, the fiber-optic strand ends are secured in clamshell space 710 inside nosepiece 900 so that they are positioned to receive light passing through LCD 716 from LED 714. The interaction of petals 1112 on the light emitted from LED 714 creates selective illumination of the opposing fiber ends (see, e.g., FIG. 10). As discussed above, the optical fibers (in either bundles or individually) are threaded throughout the panel and then poked through bottom panel 110 to emit from lower surface 102. The sum of the above creates a unique effect resembling flickering stars appears at each at different positions about the acoustic tile. And the randomness created by the petal-shaped sectoring enhances this appearance.

It is, of course, possible that other patterns could be displayed on the LCD that would also accomplish the same objectives and also fall within the scope of the claimed invention. For example, the sectoring is preferably done in some irregular pattern, but even more uniform patters are an alternative.

The embodiment discussed thus far does not use the LCD as a color filter. In other words, the state changes in the petal sectors are from transparent, to changing grey, to black, and then back to transparent (gradually). But the invention should not be considered as limited to this particular colorless arrangement. In other embodiments each sector 1112 could be a different color which is made more and then less transparent. Also possible is that color filtering could be used to change a sector color. These color changes could be used to create a variety of optical effects at each of the distal fiber ends which would be appreciated by a user in the room.

It should be noted that switching arrangements can be used so that (i) the star lighting emitted from the fibers (e.g., fibers 604 and 122); (ii) the light from the LED down lights (e.g., down light LEDs 204); and lighting emitted from the edge-lighting lineal LED strips 106 are all able to be switched on and off independently from one another. Thus, a user is able to only use the fiber illumination to create an outdoor star-like environment inside an otherwise dark room. Alternatively, the user is able to only use the LED down lights for typical white light applications. Further, the edge lighting could be used exclusively. It is also, thus, possible to use combinations of two or all three different options. Also possible is that two or more of the different light groups could be linked together on the same switch. Thus, embodiments are not necessarily limited to any particular switching arrangement.

As can be seen, the present invention and its equivalents are well-adapted to provide a new and useful illumination device and associated method of creating an optical effect. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the order described.

The invention claimed is:

1. An illumination device comprising:
   a body;
   a housing including an LED;
   liquid crystal display (LCD);
   a plurality of fiber optic fibers, each of said fibers having a first end where said fibers are bundled, and a second end where said fibers are unbundled;
   said first bundled end being received into said housing such that said first ends of said fibers are positioned to receive emissions from said LED through said LCD;
   said LCD having a plurality of separately-controllable sections, each of said sections independently changing a light characteristic when illuminated enabling the selective illumination of each of a plurality of groups of said first ends of said plurality of fibers, each of said groups including one or more of said first ends;
   each said second, unbundled ends of said fibers being spread apart from one another and used for a decorative lighting purpose in said illumination device.

2. The device of claim 1 wherein said member absorbs sound.

3. The device of claim 2 wherein said member is an accoustical tile.

4. The device of claim 1 wherein said unbundled second ends of said fibers are threaded throughout said member.

5. The device of claim 1 wherein said member inlcudes upper and lower portions, and each of said plurality of fibers is spread out for placement in a seam area between said upper and lower portions and then poked through said lower portion to emit light from a lower exposed surface of said lower portion of said member.

6. An illumination system including a plurality of units, each unit comprising:
   a body;
   a light engine including an LED;
   a liquid crystal display (LCD);
   a plurality of fiber optic fibers, each of said fibers having a first end where said fibers are bundled, and a second end where said fibers are unbundled;
   said first bundled end being received into said housing such that said first ends of said fibers are positioned to receive emissions from said LED through said LCD;
   said LCD having a plurality of separately-controllable sections, each of said sections being capable of independently changing a light characteristic when illuminated enabling the selective illumination of each of a plurality of groups of said first ends of said plurality of fibers, each of said groups including one or more of said first ends;
   each said second, unbundled ends of said fibers being spared apart from one another and used for a decorative lighting purpose in said illumination device, and an electrical connector arrangement enabling each unit to be electrically connected to a substantially identical second unit.

7. The system of claim 6 wherein said electrical connector arrangement is a piggyback connector arrangement.

\* \* \* \* \*